UNITED STATES PATENT OFFICE.

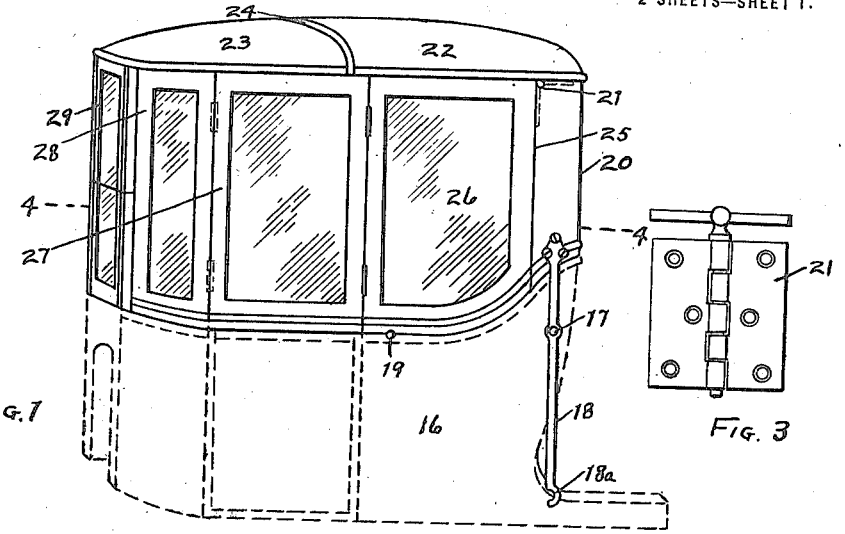
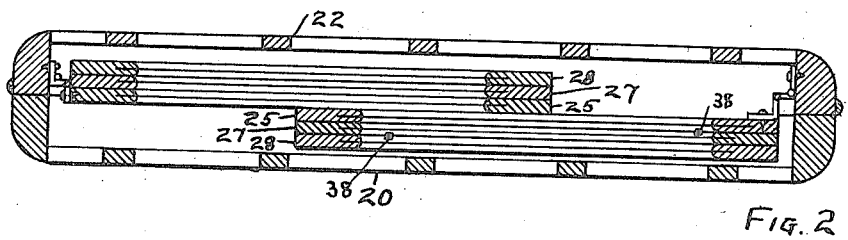
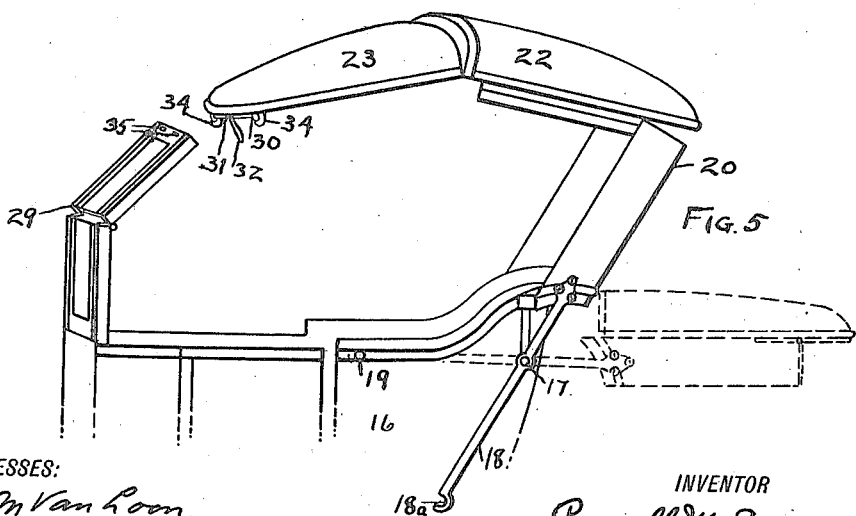

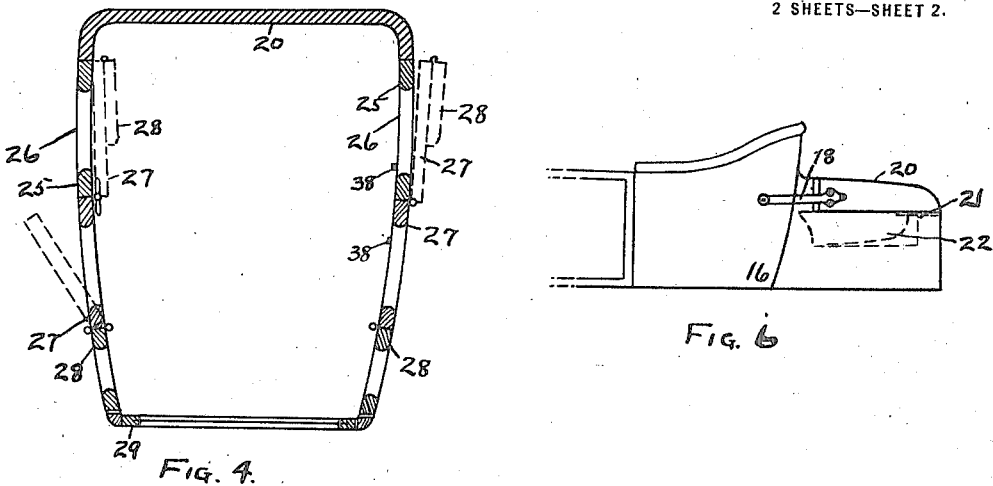
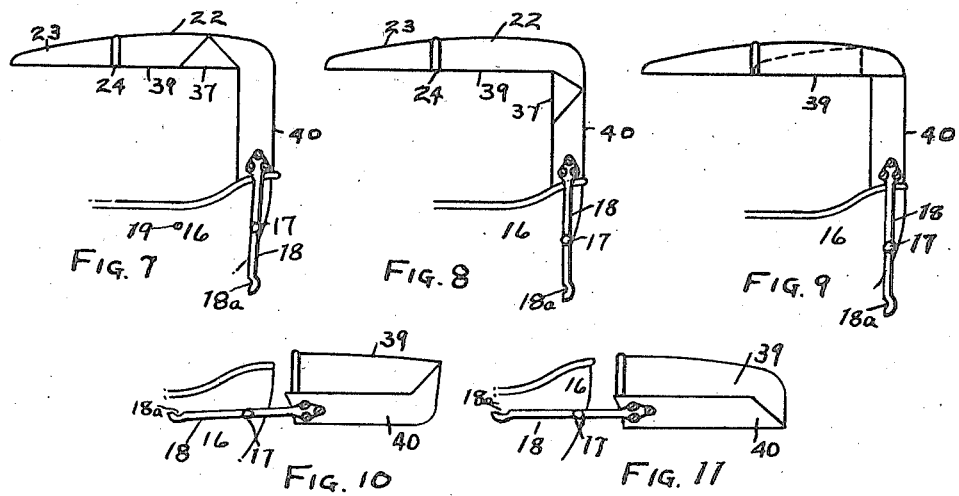
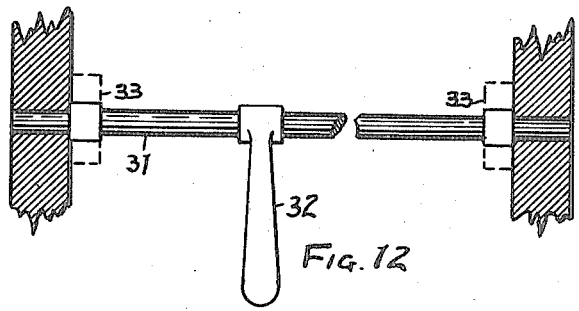
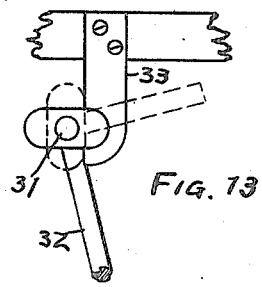

RUSSELL M. FREEMAN, OF DETROIT, MICHIGAN.

FOLDING AUTOMOBILE-TOP.

1,184,734.     Specification of Letters Patent.    Patented May 30, 1916.

Application filed February 4, 1915. Serial No. 6,166.

*To all whom it may concern:*

Be it known that I, RUSSELL M. FREEMAN, a citizen of the United States, residing at Detroit, county of Wayne, State of Michigan, have invented a certain new and useful Improvement in Folding Automobile-Tops, and declare the following to be a full, clear, and exact description of the same, such as will enable others skilled in the art to which it pertains to make and use the same, reference being had to the accompanying drawings, which form a part of this specification.

This invention relates to folding tops for vehicles, and has for its object improvements particularly directed to rigid-panel automobile tops, which may be folded down into compact space in the rear of the vehicle when not in use, and may be easily and quickly raised into extended position, and the parts clamped against swinging or rattling.

In the drawings:—Figure 1 is a perspective of a vehicle body equipped with a folding top in open or extended position. Fig. 2 is a section of the roof and side panel parts in folded position, the section being taken transversely of the vehicle. Fig. 3 is a detail of a hinge that may be used if desired, in place of cloth or fabric means of hinging the top and side panel portions to one another. Fig. 4 is a horizontal section along the line 4—4 of Fig. 1. Fig. 5 is a perspective of a slightly modified form of vehicle top, in which the sections of the roof are slidable with respect to one another, instead of being hinged. Fig. 6 is a sectional view of the central portion of the vehicle body, showing a top of this modified form in lowered position. Figs. 7, 8 and 9 are side elevational representations of the rear portion of a vehicle body and of the roof portion of a top, showing various methods of hinging or of slidably correlating the parts of a top in position for compact folding. Figs. 10 and 11 show the tops of Figs. 7 and 8 in lowered position with respect to the vehicle body. Fig. 12 is a plan view, partly in section, of a preferred form of clamping device for uniting the forward edge of the roof with the top edge of the windshield or front window, when the top is in raised position. Fig. 13 is a fragmentary side view of a clamping device and its adjacent parts.

16 represents the body of a vehicle, near whose rear end is pivoted on each side at 17 a lever arm 18, whose hooked end portion 18ᵃ is designed to engage a stop 19 when the lever is swung from the vertical position shown in Fig. 1, to horizontal position, upon the lowering of the top. The upper end of the lever arm 18, as shown in Fig. 1, is attached to the lower edge of rear panel 20, which is hinged to the rear portion 22 of the roof member, whose forward portion 23 may either be slidable with respect to the part 22, or be hinged along the meeting edge 24, the purpose in either case being to abbreviate the length of the roof as a whole, for folding into compact space.

Hinged along their top edges to the side edges of the roof section 22 are panel frames 25 provided with lights of glass 26. To the forward edges of each one of these panel frames 25 is hinged the next forward section or panel 27, also provided with a light of glass, and the forward edge of the panel 27 is similarly hinged with panel frame 28. Neither of these latter two, 27 or 28, however, are hinged to the top, each being adapted to be folded over and upon one another, and in turn upon the panel 25, when it is desired to fold the top down, so that before the now three-fold panel, composed of the parts 25, 27 and 28, is ready for raising, they lie in the assembled parallel position shown particularly in Fig. 2, being spaced from one another, if desired, by rubber stops 38.

To prevent rattling or poor fitting, the top edges of these panels 27 and 28 may fit when in raised position in a suitably prepared groove in the under side of the top pieces 22 and 23. When the hinged panels comprising each side of the foldable top are thus extended to the position shown in Fig. 1, they constitute, together with the windshield 29, a complete inclosure for the protection of the rider, and in this position the clamp 30, which is carried upon the forward edge of the forward section of the roof is used to lock it and the upper edge of the windshield together. In Figs. 12 and 13 I have illustrated preferred form of this clamp, which consists of a shaft 31 to which is fixed an actuating handle 32, the ends of the shaft being journaled in depending brackets 33. The hooked end portions 34 are designed to engage in suitable slotted or looped portions 35 in the top edge of the windshield or front window 29. The position of the shaft shown in full lines in Fig.

13 is that occupied by the parts of the clamp before being locked in position, which latter is indicated by the dotted line position of the handle 32. I do not, however, confine myself to this form of clamp, as others equally efficient may of course be substituted therefor without departure from the spirit of my invention.

In Figs. 7 to 11 inclusive, I have illustrated various types and positions lowered and raised, of a top whose component parts are formed of closely fitting sections 39 and 40, whose hinged edges are respectively beveled or cut away sufficiently so that in lowered position they will fit closely as shown in Figs. 10 and 11. These are preferably of the type of top in which a cloth hinge is resorted to, and in that case the angular or wedge-shaped space between their beveled edges may be covered as far as the interior finish of the vehicle is concerned, by a web of cloth 37 which easily doubles up in negligibly small space, between these beveled edges when the top is lowered.

Of course the hooked arm or end 18$^a$ of the pivoted member 18, together with its stop member 19, may, if desired, be omitted, as shown in Fig. 6, in which case the top as lowered and folded must rely upon the support of the rear portions of the vehicle body. If, however, the hooked arm 18$^a$ and its stop 19 are made use of, the downward travel of the folded top may be positively and definitely regulated and stopped. And if the shape of the rear portion of the vehicle body permitted the link members could be omitted entirely, and the lower edge of the rear panel 20 be hinged directly to the upper portion of the vehicle back instead. In this latter case the line of hinging of the rear panel to the vehicle body may be either along the top edge of the back or at any convenient distance below.

It is also obvious that as far as the correlation of folding rear and roof panel members is concerned, this could be followed, with variant results as regards the completeness of the protection afforded the rider, even if the side panel members were not employed.

What I claim is:—

1. A folding vehicle top, comprising a rear panel, a roof piece, a pair of main side panels hinged to said roof piece along their top edges and adapted to be swung therebeneath for lowering, auxiliary side panels hingedly supported from said main side panels, and pivoted link members connecting the rear panel with the body of the vehicle.

2. In combination with a roof panel comprising a pair of adjustable sections, a rear panel hinged to the rear edge thereof along its top edge and to a supporting vehicle body along its bottom edge, a pair of main side panels hinged along their top edges to the sides of the roof panel and a plurality of supplemental side panels hingedly supported by said main side panels.

In testimony whereof, I sign this specification in the presence of two witnesses.

RUSSELL M. FREEMAN.

Witnesses:
  MARION F. KIEFER,
  JEFFERSON G. THURBER.